R. B. GLIDDEN.
WATERING DEVICE.
APPLICATION FILED JUNE 13, 1918.

1,314,585.

Patented Sept. 2, 1919.
2 SHEETS—SHEET 1.

Witness:

Inventor:
Raymond B. Glidden
By Walter M. Fuller
Atty.

R. B. GLIDDEN.
WATERING DEVICE.
APPLICATION FILED JUNE 13, 1918.
1,314,585.
Patented Sept. 2, 1919.
2 SHEETS—SHEET 2.
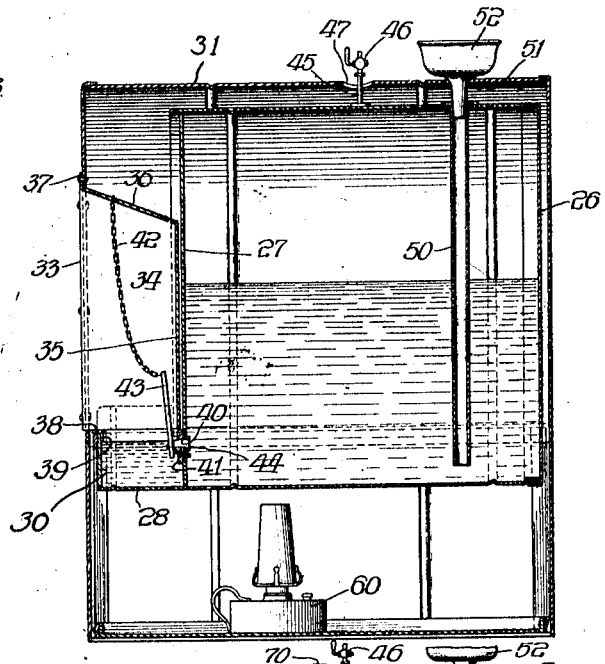
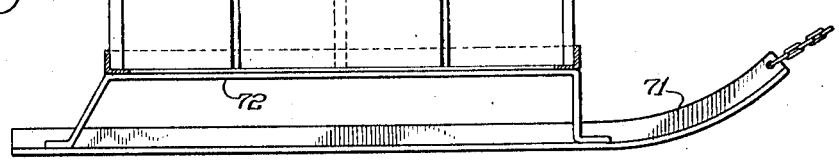
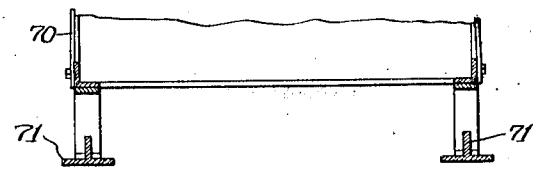
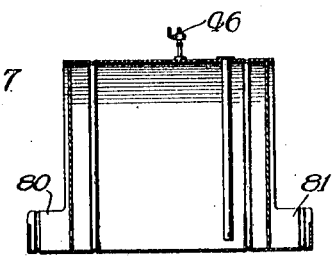
Witness:
Geo. C. Larson
Inventor:
Raymond B. Glidden
By Walter M. Fuller
Atty.

UNITED STATES PATENT OFFICE.

RAYMOND B. GLIDDEN, OF KEWANEE, ILLINOIS, ASSIGNOR TO KEWANEE IMPLEMENT COMPANY, OF KEWANEE, ILLINOIS, A CORPORATION OF ILLINOIS.

WATERING DEVICE.

1,314,585.  Specification of Letters Patent.  Patented Sept. 2, 1919.

Application filed June 13, 1918. Serial No. 239,830.

*To all whom it may concern:*

Be it known that I, RAYMOND B. GLIDDEN, a citizen of the United States, residing at Kewanee, in the county of Henry and State of Illinois, have invented certain new and useful Improvements in Watering Devices, of which the following is a specification.

The present invention pertains to improvements in stock-watering appliances, such as hog-waterers, and aims to improve the present devices of this kind in several particulars.

In the employment of a watering apparatus of this character, it is desirable to mount the structure on a sled or drag so that it may be drawn to the source of water supply, such as a pump or well, for filling. It is important, therefore, to provide an appliance of this character with a low center of gravity whereby to avoid the danger of overturning or upsetting. In the improved apparatus constituting the subject-matter of the present application this desirable result is obtained by providing the water supply-tank in the form of a cylindrical barrel and disposing the same horizontally in a supporting skeleton framework and combining the same with a drinking-trough not located below the barrel as is customary, but elevating the same at least to a level with the lower part of the tank, whereby the latter may be disposed at a relatively low level with a corresponding center of gravity.

In the preferred form of the structure the trough or drinking receptacle is in one end of the barrel, one of its walls constituting a direct integral extension of the cylindrical wall of the tank or barrel, whereby the tank and trough form a unitary structure. By employing this type or style of construction, both the tank and trough are directly and efficiently supported by the skeleton framework into which they project and in the top part of which they snugly fit.

The improved and novel device includes also an outer shell or housing, forming between itself and the barrel and trough, an air chamber, the air of which acts as a heat-insulating means tending to keep the water cool in summer and adapted to be heated in winter by a lamp or stove to maintain the liquid at a desirable temperature and prevent its freezing. This outer shell to which the top portion of the trough or rather its canopy is permanently secured, is readily lifted off of the appliance without detaching anything except removing its own fastening bolts. The front bar of the supporting frame is located at the top edge of the drinking trough and protects the front wall of the latter from injury, the casing structure being such that at this point it is bent over these two parts forming a smooth finish for the bottom edge of the casing opening or canopy and yet readily removable from the structure without detachment of any parts.

The customary air-cock or valve for the supply-tank is positioned outside of the exterior shell or housing and hence, for the filling or water replenishing operation, is readily accessible without manipulation of any cover or door. For such refilling the device is equipped with a funnel which fits into a vertical tube in the tank, the funnel projecting out through the outer casing and hence easily used without operating any cover and also preventing the water from spilling and flowing down the outside of the barrel. Furthermore, the structure is such that the position of the heating lamp or stove, when one is used, may be varied; it may be under the trough or under the tank as seems desirable.

The accomplishment of these and other desirable purposes and objects will be readily understood from a consideration of the drawings forming a part of this specification and throughout the various views of which like reference characters refer to the same parts, which drawings illustrate two embodiments of the invention.

In these drawings:

Fig. 3 is a central, longitudinal, vertical section through the entire structure;

Fig. 4 illustrates in a fragmentary way and in section the manner of mounting such watering appliance on a sled or drag;

Fig. 5 is a cross-section through such sled or drag showing a portion only of the watering-appliance proper;

Fig. 6 is a fragmentary view of the valve or plug structure for closing the connection between the tank and trough; and Fig. 7 illustrates in longitudinal vertical section a structure of this kind with a trough at each end.

Figure 1:
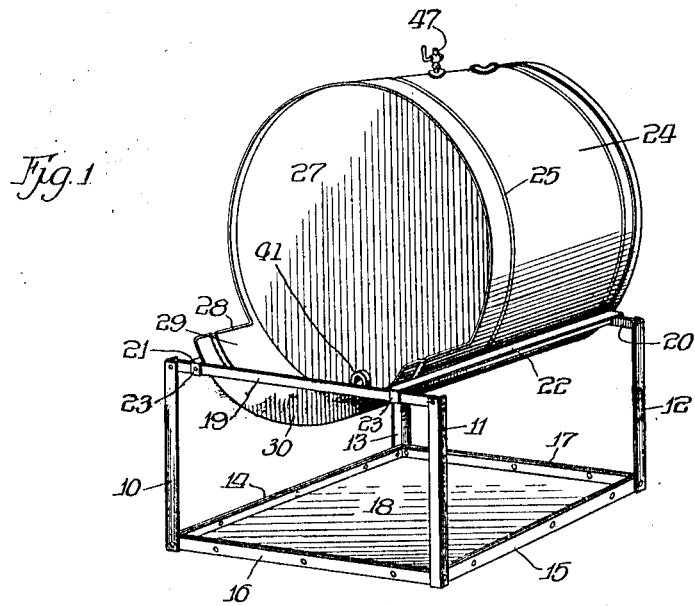
Figure 1 is a perspective view of the water-supply tank, the trough, and the supporting frame.
Figure 2:
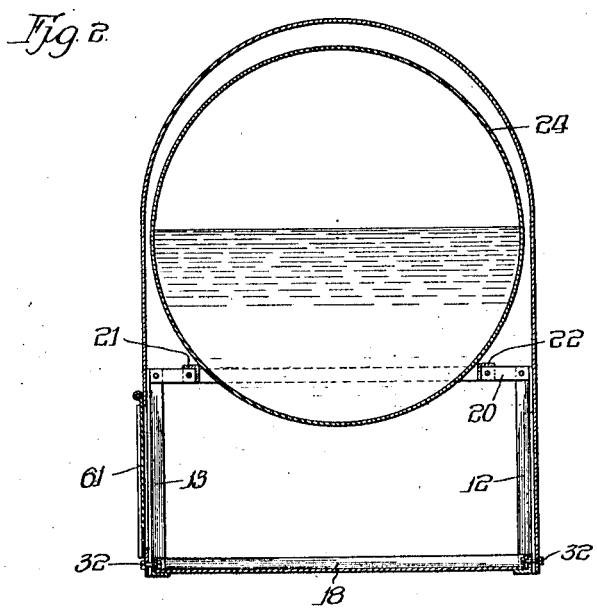
Fig. 2 is a vertical cross-section through these parts and the incasing housing.

The new appliance comprises a skeleton-frame composed of four, upright, angle-bar posts or corner-pieces 10, 11, 12, and 13, the lower ends of which are connected together by a pair of parallel, longitudinal angle-bars 14 and 15 and transverse, flat bars or strips 16 and 17 to the upstanding or vertical portions of which the rim or flange of a sheet-metal tray or pan 18 is riveted, such pan, as is clearly shown, fitting in the rectangular bottom portion of the frame. The upper ends of such posts or corner-bars are connected together crosswise by two flat bars 19 and 20 which in turn are fastened together lengthwise the frame by a pair of parallel angle-bars 21 and 22, each arranged with one flange vertical and its other flange outwardly extended horizontally. Such spaced, longitudinal angle-bars at their ends have their vertical flanges cut away and their horizontal flanges bent over to provide ears 23 by means of which the fastening to the end bars is readily effected. It will be apparent, therefore, that this frame has a rectangular top opening composed of the bars 19, 20, 21, and 22 adapted to act as a pocket or cradle to receive the lower portion of the curved water supply-tank and the trough.

The water reservoir or supply receptacle comprises a sheet-metal, cylindrical barrel or tank 24 having one or more inwardly-extended stiffening ribs 25 and the circular end walls or heads 26, 27. The lower portion of the curved wall of the tank or barrel is extended lengthwise at 28 beyond the tank end or head 27 and forms the wall of a trough 29 having a front, sheet-metal, segment wall 30. The tank and trough are received in the open top of the frame with their common axis horizontal so that the lower curved part of both extend downwardly into the frame, thus providing a low center of gravity, both resting on and being supported by the parallel angle-bars 21 and 22. It will be perceived that the flat frame end-bar 19 is directly in front of the sheet-metal wall 30 of the trough, thus protecting the latter from damage or injury and it also is in substantial register with its top edge.

Snugly fitted over this frame and inclosing the tank and trough is a sheet-metal shell or casing 31 whose upper part is substantially semi-cylindrical in form, its lower portion being rectangular in shape and closely fitting around the frame, thus assisting in preventing the latter, which is without diagonal or corner bracing, from becoming distorted out of shape. Such casing, shell, or housing, is secured to the frame by means of readily-removable bolts 32 placed in convenient locations.

One end wall of the casing has a rectangular opening 33 above the trough and fitted in such aperture and located inside the shell is a sheet-metal housing or canopy for the trough partitioning off the space above the latter from the adjoining space and acting in large measure to prevent the transfer of air from the inside of the casing to the outer atmosphere, and vice versa. Such housing or trough inclosure comprises side-walls 34, a back-wall 35, and a top-wall 36, conveniently permanently secured or fastened to the casing by flanges 37 located outside of and against the outer face of the casing end-wall to which they are riveted or bolted. This trough housing or canopy at its bottom is open, thus permitting the animal whose head is inserted therein to have access to the water in the trough. The metal of the casing end-wall at the lower margin of the opening 33 is bent inwardly at 38 over the alined top edges of the bar 19 and the end or front-wall 30 of the trough and then downwardly at 39, thus forming a neat smooth finish for such portion of the structure and also acting to prevent rotary displacement of the tank and trough in the supporting frame.

As is clearly shown, the tank or barrel head 27 has an aperture 40 therethrough equipped with a bushing 41 by means of which the water is enabled to flow from the tank or barrel into the trough, the hole, of course, determining the level at which the water will be automatically maintained in the drinking-compartment. In order that this opening may be temporarily closed or stopped during the refilling of the tank, a chain 42 is fastened at one end inside of the trough canopy to its top wall, such chain carrying at its lower end a bar 43 provided with a rubber or other suitable plug or ball 44 fastened thereto preferably at an angle. When not in use, this handle-bar 43 and the ball-valve which it carries hang idly in the trough and when they are to be employed to stop communication between the tank and trough the operator by means of the bar inserts the plug in the opening as clearly indicated in Fig. 3.

At its top the tank or reservoir member has a short pipe 45 equipped with an air-vent cock or valve 46 located above the corresponding wall of the outer casing, the latter having a registering aperture 47 through which the pipe extends and of sufficient size to permit the casing to be lifted off without disturbing the valve or cock.

In addition, the tank has a tube or pipe 50 extended through its top wall and reaching nearly to its bottom wall, the tube having an air-tight connection with the margin of the tank hole through which it extends. Above the upper end of this filling tube or pipe the casing has another opening 51 accommodating the shank of a removable funnel 52 which projects down into the upper end of pipe 50.

In order to replenish the water supply in the tank or reservoir, the operator, by means of the stopper 44, closes the passage through the bushing 41, the air-cock is opened, and the water poured into the funnel, which, of course, delivers it into tube 50 and down into the lower part of the barrel. A sufficient supply having been introduced, the air-cock is closed and the plug or stopper removed. During such introduction of the water through the funnel or tube, owing to their direct or interfitting connection the one with the other, there is no danger of the water escaping and flowing down the outer sides of the barrel.

When a lamp or stove 60 is set in the pan or on the floor 18 to heat the water, the opening 47 at the air-vent valve permits a sufficient escape of the products of combustion to facilitate the ready heating operation, but the funnel if allowed to remain in place, desirably prevents such escape at that point. In order to permit the insertion and removal of the lamp as well as enable its proper attention, the casing at one side has a sliding door or cover 61 fitting over an opening in the wall and such door may be opened and closed or made to remain in a partially open condition.

I have referred above to the use of such an appliance on a sled or drag to permit it to be drawn to the source of water supply and the need for a low center of gravity under such circumstances. In Figs. 4 and 5 I have shown the waterer mounted on such a sled, which may be of any suitable or desirable construction and held thereon by means of an encircling metal strap 70. In the present instance the sled comprises a pair of spaced, parallel T-bar curved runners or shoes 71, 71, provided with a super-structure 72 on which the waterer rests.

In Fig. 7 I have illustrated a somewhat modified tank structure equipped with two troughs 80 and 81, one at each end. In this device, of course, the shell or casing would have an opening at each end to permit the use of both drinking-fountains.

In this application I have presented two embodiments only of the invention, but it is to be understood that the latter is susceptible of a variety of embodiments and that this invention is not limited and restricted to the exact structural details herein presented because these may be varied to a large degree without departure from the heart and essence of the invention and without the sacrifice of any of its substantial benefits and advantages.

I claim:

1. In a watering-appliance of the character described, the combination of a skeleton-frame, a cylindrical water-supply tank supported by said frame and disposed with its longtudinal axis substantially horizontal, a trough at an end of and replenished with water from said tank, the lower portion only of the cylindrical wall of said tank being extended lengthwise beyond an end of the tank to form the bottom wall of said trough, an apertured outer casing inclosing said tank and trough, and a canopy secured to said casing fitted in said casing aperture, and projecting inwardly over said trough, whereby said casing and canopy may be lifted free from the appliance without interference with the tank or trough, substantially as described.

2. In a watering-appliance of the character described, the combination of a skeleton-frame having an open top with bars bordering said top opening lengthwise, a cylindrical water-supply tank disposed with its axis substantially horizontal and partially accommodated in said frame top opening, its cylindrical wall resting on said longitudinal frame-bars, and a trough at an end of said tank having a curved bottom-wall in register with the lower portion of the cylindrical wall of said tank, said trough wall also extending into said frame top opening and resting upon said longitudinal bars, substantially as described.

3. In a watering-appliance of the character described, the combination of a skeleton-frame, a water-supply tank and a trough supplied with water from said tank both supported by said frame, an outer casing, an upper canopy for said trough mounted in said casing, and fastening means securing said casing to said frame, removal of said fastening means only permitting the casing and trough canopy to be lifted free from the remainder of the structure, substantially as described.

4. In a watering-appliance of the character described, the combination of a skeleton-frame, a water-supply tank, a trough supplied with water from said tank, said tank and trough being supported on said frame, an outer sheet-metal casing having a trough opening rendering the inclosed trough accessible, the sheet-metal of said casing at the lower margin of said opening being bent inwardly and then downwardly over a wall of said trough, substantially as described.

5. In a watering-appliance of the character described, the combination of a skeleton-frame, a water-supply tank, a trough supplied with water from said tank, said tank and trough being supported on said frame, an outer sheet-metal casing having a trough opening rendering the inclosed trough accessible, the metal of said casing at the lower margin of said opening being bent inwardly and downwardly over a portion of said frame and a wall of said trough, substantially as described.

6. In a watering-appliance of the character described, the combination of a skeleton-frame, a water-supply tank, a trough supplied with water from said tank, said tank and trough being supported on said frame, a sheet-metal outer casing having a trough opening rendering the inclosed trough accessible, a bar of said frame being in substantial register with the top edge of the outer end wall of the trough, the metal of said casing at the lower margin of said opening being inwardly bent and then downwardly over said bar and edge of the trough, substantially as described.

7. In a watering-appliance of the character described, the combination of a skeleton-frame, a cylindrical water-supply tank, a segmental trough supplied with water from said tank and forming a direct extension of the tank, said tank and trough being supported on said frame, a sheet-metal outer casing having a trough opening rendering the inclosed trough accessible, a bar of said frame being in substantial register with the top edge of the outer end wall of said trough, the metal of said casing at the lower margin of said opening being bent inwardly and then downwardly over said bar and trough edge, substantially as described.

RAYMOND B. GLIDDEN.

Copies of this patent may be obtained for five cents each, by addressing the "Commissioner of Patents, Washington, D. C."